United States Patent
Arditti Modiano et al.

(10) Patent No.: US 7,697,680 B2
(45) Date of Patent: Apr. 13, 2010

(54) TRACEABLE METHOD AND SYSTEM FOR ENCRYPTING AND/OR DECRYPTING DATA, AND RECORDING MEDIA FOR IMPLEMENTING THE METHOD

(75) Inventors: David Arditti Modiano, Clamart (FR); Oliver Billet, Tourrettes/Loup (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 1066 days.

(21) Appl. No.: 10/560,429

(22) PCT Filed: Jun. 2, 2004

(86) PCT No.: PCT/FR2004/001362

§ 371 (c)(1),
(2), (4) Date: Mar. 13, 2006

(87) PCT Pub. No.: WO2005/008951

PCT Pub. Date: Jan. 27, 2005

(65) Prior Publication Data

US 2006/0153377 A1    Jul. 13, 2006

(30) Foreign Application Priority Data

Jun. 17, 2003    (FR)    ................................. 03 07287

(51) Int. Cl.
*H04L 9/28* (2006.01)
(52) U.S. Cl. .................. 380/28; 380/200; 380/259; 713/150; 726/26
(58) Field of Classification Search .................. 380/202
See application file for complete search history.

(56) References Cited

U.S. PATENT DOCUMENTS 6,880,088 B1 *  4/2005  Gazier et al. .................. 726/12

OTHER PUBLICATIONS

"An Efficient Public Key Traitor Tracing Scheme" Advances in Cryptology—Crypto '99. 19th Annual International Cryptology Conference Proceedings. Santa Barbara, CA, USA (1999) pp. 338-353.*
"Public Quadratic Polynomial-Tuples for Efficient Signature-Verification and Message-Encryption." Advances in Cryptology-Eurocrypt '88. International Conference on the Theory and Application of Cryptographic Techniques Proceedings. Springer Verlag, DE (1988), pp. 419-453.*
Billet O, Gilbert H: "A Traceable Block Cipher" Asiacrypt 2003: 9th International Conference on the Theory and Application of Cryptology and Informattion Security (Springer-Verlag, Heidelberg, Lecture Notes in Computer Science 2894), Nov. 2003, pp. 331-346, XP002273113 ISBN: 3-540-20592-6 the whole document.

(Continued)

*Primary Examiner*—Minh Dinh
(74) *Attorney, Agent, or Firm*—Young & Thompson

(57) ABSTRACT

A traceable method for encrypting and/or decrypting data broadcast by at least one transmitter towards several decoders includes the steps: during encryption of broadcast data, the transmitter implements (in 86) at least one first secret function to transform an unencrypted message into an encrypted message; and during decryption of the broadcast data, all the decoders implement (in 92) at least one common second secret function, each decoder using therefor a mathematical description of the second function stored in a memory (21), the mathematical description of the second function being different from one decoder to another or from one group of decoders to another such that the mathematical description used identifies exclusively the particular decoder or group of decoders.

18 Claims, 2 Drawing Sheets

OTHER PUBLICATIONS

Figure 1:
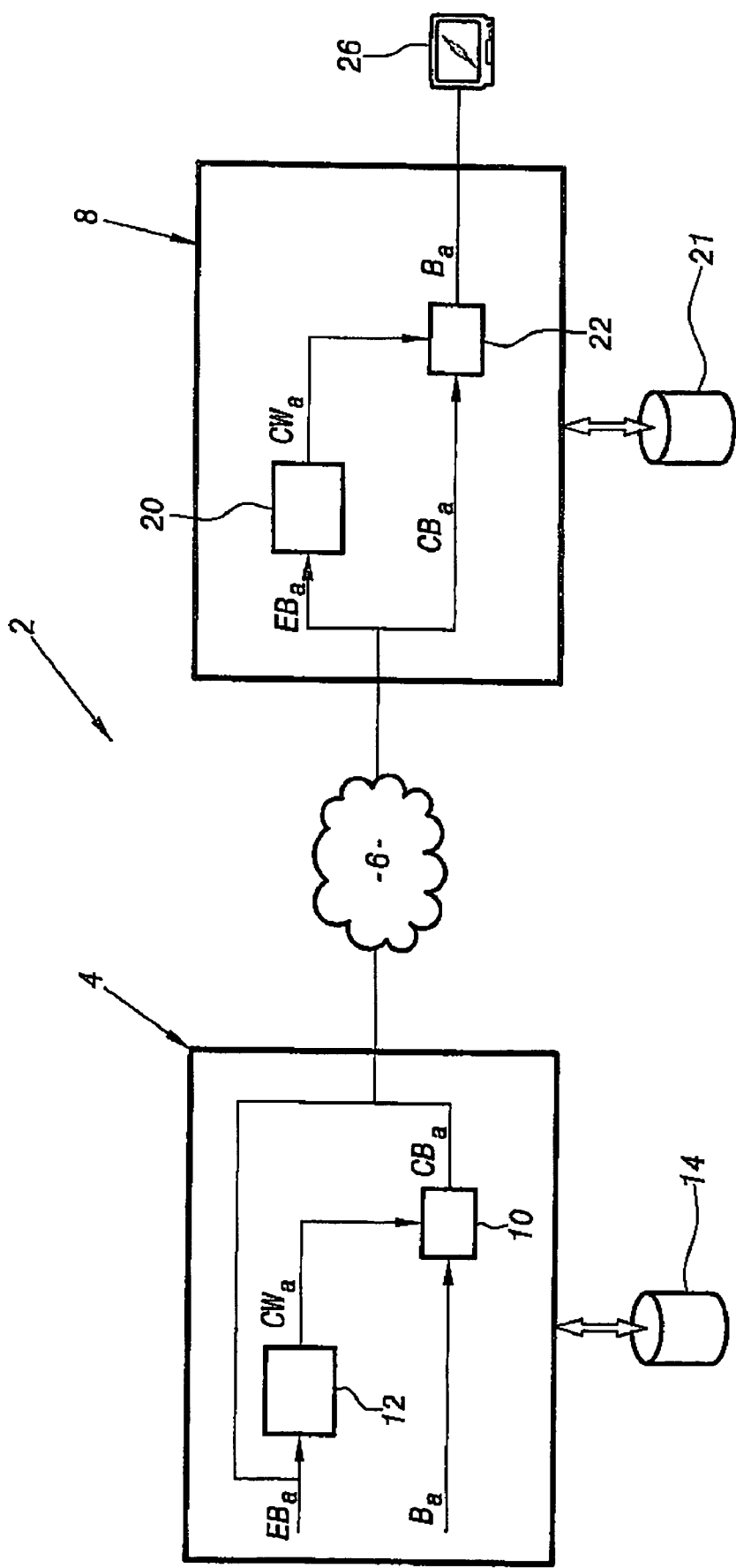

Boneh D: Franklin M; "An efficient public key traitor tracing scheme" Advances in Cryptology—Crypto'99. 19th Annual International Cryptology Conference. Proceedings, Aug. 19, 1999, pp. 338-353, XP002273114 Santa Barabara, CA, USA ISBN: 3-540-66347-9 p. 338-p. 343.

Matsumoto T; Imai H: "Public Quadratic Polynomial-Tuples for Efficient Signature-Verification and Message-Encryption" Advances in Cryptology-Eurocrypt '88. International Conference on the Theory and Application of Cryptographic Techniques, Proceedings. Springer Verlag, DE, 1988, pp. 419-453, XP005688374 ISBN: 3-540-50251-3 cited in the application the whole document.

Menezes; Oorschot; Vanstone: "Handbook of Applied Cryptography, Passage" CRC Press Series on Discrete Mathematics and Its Applications, 1997, pp. 551-552, XP002273115 Boca Raton, FL, USA ISBN: 0-8493-8523-7 p. 551, paragraph 13.3.1-p. 552.

Patarin J; Goubin L; Courtois N: "Improved algorithms for isomorphisms of polynomials" Advances in Cryptology-Eurocrypt '98. Application of Cryptographic Techniques. Proceedings, Jun. 4, 1998, pp. 184-200, XP002273116 Espoo, Finland ISBN: 3-540-64518-7 the whole document.

* cited by examiner

TRACEABLE METHOD AND SYSTEM FOR ENCRYPTING AND/OR DECRYPTING DATA, AND RECORDING MEDIA FOR IMPLEMENTING THE METHOD

CROSS-REFERENCE TO RELATED APPLICATIONS

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention pertains to a traceable method and system for encrypting and/or decrypting broadcast data, and to recording media for implementing the method.

More precisely, the invention concerns a traceable method in which:
when encrypting broadcast data, the transmitter applies at least one first secret cryptographic function, and
when decrypting said broadcast data, all the decoders apply at least one same second secret cryptographic function identical to said first function or its inverse, each decoder for this purpose using a mathematical description of said second function recorded in a memory.

Traceable encrypting methods are methods in which a method for tracing traitors may be implemented.

2. Description of Related Art

Traitor tracing methods are used to fight against the pirating of services which, on a broadcast channel, distribute encrypted multimedia contents such as video, television, images, music, texts, Web pages, electronic books, programmes etc. The purpose of traitor tracing methods is to prevent one or more lawful users of said services from re-distributing data deduced from the secret keys and decryption algorithms implanted in their decrypting equipment so as to enable unlawful users (pirates) to have in-clear access to said content. These methods guarantee that if such a fraud should occur, the identity of at least one of the lawful users at the source of the fraud may be reconstituted by the service operator distributing the content, or more generally be an authority, on the basis of data re-distributed to unlawful users. The lawful user at the source of the fraud is called a "traitor" in the remainder of the description.

The notion of tracing traitors was proposed for the first time by Benny Chor, Amos Fiat and Moni Naor in their 1994 article: "Tracing Traitors, Advances in Cryptology"—Crypto '94, Lecture Notes in Computer Science, vol. 839, Springer-Verlag, 1994, pp. 257-270. In this article, the first tracing techniques in a cryptographic system are put forward. The cryptographic systems in which a traitor tracing method may be implemented are called "traceable". Almost all these techniques are of combinatory nature. In other words, each lawful user of the cryptographic system is allotted a sub-set of keys of a set (generally a fairly large set) of basic keys. This sub-set of basic keys allotted to a user is unique for each user and forms the user's own personal key.

The data broadcast within this system comprises encrypted messages. Each encrypted message is formed of a content, encrypted by means of a content-encrypting key, and of headers each encrypted with a basic key. Each header contains a value representing part of the content-encrypting key.

When users receive one of these messages, they use their sub-set of basic keys to decrypt some values contained in the received headers. They then combine these decrypted values to reconstitute the content-encrypting key, and this reconstituted content-encrypting key is used to decrypt the content of the message.

If one of the lawful users of the system communicates his/her personal key to an unlawful user, then in this traceable cryptographic system it is possible to trace the identity of the traitor from the personal key used by the unlawful user.

However, traitor tracing methods of combinatory nature have the disadvantage of requiring the broadcasting of a considerable volume of headers. In particular, the number of headers to be broadcast is proportional to the logarithm of the number of lawful users of the system, and to other parameters such as the maximum size k of traitor coalitions against whom protection is sought. By coalition here is meant a group k of traitors who group together to combine their personal keys in an attempt to create a new personal key which can be used to decrypt the encrypted content, without examination of this new personal key disclosing the identity of one of the traitors.

The invention sets out to remedy this drawback by proposing a new traitor using method which does not require the broadcasting of a large number of headers.

BRIEF SUMMARY OF THE INVENTION

The subject of the invention is therefore a traitor tracing method such as described above, characterized in that when implementing the second function, the mathematical description of this second function to which each decoder has recourse is different from one decoder to another or from one group of decoders to another, so that the mathematical description to which recourse is made exclusively identifies the particular decoder or group of decoders among all the decoders.

In the above method, it is possible to trace the traitor who communicated the mathematical description of his/her secret second function to an unlawful user, on the basis of analysis of the mathematical description of this second function used by the unlawful user to decrypt the transmitted data. Through the construction of each mathematical description in the system, said description represents the identity of the traitor. With the combinatory methods, on account of the fact that a personal set of keys is used in each decoder, the same content-encrypting key has to be transmitted several times encrypted in different forms. The headers placed at the start of the broadcast content are used for this purpose. Therefore the information contained in the headers is extremely redundant and each decoder only processes part of the received headers.

In the inventive method, on account of the fact that traitor identification is no longer based on the use of personal sets of keys but on use by the transmitter of different descriptions of one same cryptographic function, identical to the first cryptographic function, or its inverse, it is no longer necessary for at least part of the broadcast data to be redundant. Consequently the number of headers needed to broadcast an encrypted message using the above method is lower than the number of headers needed to broadcast the same message using a combinatory method.

According to further characteristics of the method, it is characterized in that:

the second cryptographic function is able to process non-redundant data;

said mathematical description $F_{Kj}$ recorded in the memory of each decoder is formed of several elementary functions $G_{i,j}$ which must be composed one after the other in determined order to form said second secret function;

each elementary function $G_{i,j}$ is equal to the composition of at least three functions as per one of the following equations:

$$G_{1j} = f'_{1,j} \circ g_{\sigma j(1)} \circ S$$

$$G_{2j} = f'_{2,j} \circ g_{\sigma j(2)} \circ f_{1,j}$$

$$\ldots$$

$$G_{r-1,j} = f'_{r-1,j} \circ g_{\sigma j(r-1)} \circ f_{r-2,j}$$

$$G_{r,j} = T \circ g_{\sigma j(r)} \circ f_{r-1,j}$$

in which:

$G_{i,j}$ is the -th elementary function of decoder j, j being the index identifying a decoder or group of decoders, functions $f_{i,j}$ and $f'_{i,j}$ are predefined functions able to render the elementary functions $G_{i,j}$ non-commutative between each other, $\sigma_j$ is a permutation of all indices $\{1; \ldots ; r\}$ unique to each decoder or group of decoders, $g_{\sigma j(t)}$ is the $\sigma_{j(t)}$-th function of a predefined whole formed of r non-linear predefined functions $g_i$ commutative between each other, and S and T are predefined functions able to render difficult the cryptanalysis of elementary functions $G_{1,j}$ and $G_{r,j}$ respectively, each function $f'_{i,j}$ is equal to the inverse $f_{i,j}^{-1}$ of function $f_{1,j}$, functions $f_{i,j}$ are linear functions of a set $L^n$ of the tuples of elements of a finished body L on itself;

functions S and are T are invertible;

functions S and T are linear functions of a set $L^n$ of the tuples of elements of a finished body L towards itself;

functions $g_1$ are chosen so that each elementary function $G_{i,j}$ corresponds to an encryption block of a multivariate encryption algorithm;

each function $g_i$ is of the form $g_i(a) = a^{ei}$, in which a is an element of an extension L' of degree n of a basic body L with q elements, and $e_i$ is a predefined exponent;

the exponent $e_i$ is of the form $1 + q^{\theta 1} + \ldots + q^{\theta i} + \ldots + q^{\theta d-1}$, in which the exponents $\theta_i$ are predefined integers.

Another subject of the invention is a data recording medium, characterized in that it comprises instructions for executing a traceable method of the invention, when these instructions are performed by a decoder.

A further subject of the invention is a data recording medium, characterized in that it comprises instructions for executing a traceable method of the invention, when said instructions are performed by a transmitter.

A further subject of the invention is a traceable encryption and/or decryption system for broadcast data capable of enabling the identification of a traitor, among different lawful users, who has communicated secret data to a third non-authorized party enabling this third party to encrypt and/or decrypt broadcast data, this system comprising:

a transmitter able to encrypt broadcast data, this transmitter being able to implement at least one first secret cryptographic function, and several decoders able to decrypt the broadcast data, all the decoders being capable of implementing at least one same secret cryptographic function identical to said first function or its inverse, each decoder for this purpose being equipped with a memory in which a mathematical description of said second function is recorded;

characterized in that the memory of each decoder contains a mathematical description of said second function different from the one recorded in the memory of the other decoders or in the memory of the other groups of decoders, so that this mathematical description exclusively identifies the particular decoder or group of decoders among all the decoders.

Finally, a further subject of the invention is a memory intended to be associated with a decoder of a traceable encryption and/or decryption system according to the invention, characterized in that it comprises a mathematical description equivalent to said second secret function able to be used by the decoder, this mathematical description consisting of several elementary functions $(G_{1,j})$ each one equal to the composite of at least three functions as per one of the following equations:

$$G_{1j} = f'_{1,j} \circ g_{\sigma j(1)} \circ S$$

$$G_{2j} = f'_{2,j} \circ g_{\sigma j(2)} \circ f_{1,j}$$

$$\ldots$$

$$G_{r-1,j} = f'_{r-1,j} \circ g_{\sigma j(r-1)} \circ f_{r-2,j}$$

$$G_{r,j} = T \circ g_{\sigma j(r)} \circ f_{r-1,j}$$

in which:

$G_{i,j}$ is the -th elementary function of decoder j, j being the index identifying a decoder or group of decoders, functions $f_{ij}$ and $f'_{1,j}$ are predefined functions able to render the elementary functions $G_{i,j}$ non-commutative between each other, $\sigma_j$ is a permutation of all indices $\{1; \ldots ; r\}$ unique to each decoder or group of decoders, $g_{\sigma j(t)}$ is the $\sigma_{j(t)}$-th function of a predefined whole formed of r non-linear predefined functions $g_i$ commutative between each other, and S and T are predefined functions able to render difficult the cryptanalysis of the elementary functions $G_{1,j}$ and $G_{r,j}$ respectively,

BRIEF DESCRIPTION OF THE SEVERAL VIEWS OF THE DRAWING(S)

Figure 2:
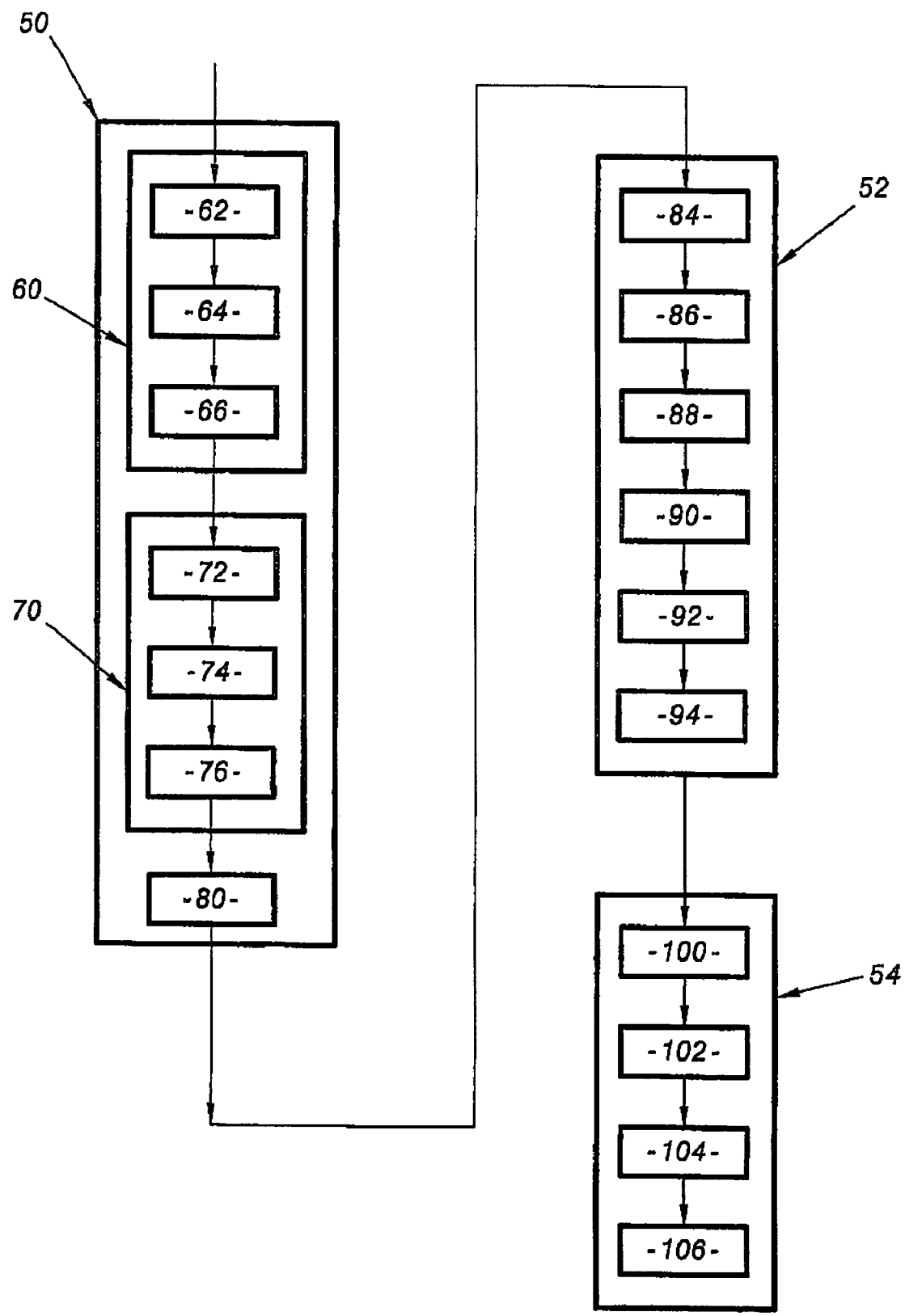

The invention will be better understood on reading the following description, given solely as an example and made with reference to the drawings in which:

FIG. 1 is a schematic illustration of the architecture of a traceable cryptographic system according to the invention, and FIG. 2 is a flow chart of the traitor tracing method of the invention.

DETAILED DESCRIPTION OF THE INVENTION

FIG. 1 shows a traceable cryptographic system, generally designated 2. This system 2 comprises a transmitter 4 of encrypted data, a data transmission network 6 and decoders able to decrypt encrypted data broadcast by the transmitter 4 through the network 6. The system 2 comprises N decoders, N being an integer greater than 100, 1000 or more. Here, to simplify the illustration, only one decoder 8 is shown. The other decoders, not shown, are identical for example to decoder 8. In the remainder of the description, this decoder 8 is associated with the index j.

By way of example, the transmitter 4 is a transmitter of paying television channels. This transmitter 4 comprises a module 10 for encrypting a content $B_a$ and a module 12 for calculating a control word $CW_1$. Content $B_a$ is here formed of a succession of data bits representing the television channels is clear, i.e. not encrypted.

Module 12 is able to execute a cryptographic function defined by a mathematical description $F_K$. This cryptographic function is intended to directly process a header $EB_a$ coded over n characters to convert it into a control word $CW_a$ also coded over n characters, n being a strictly positive integer greater than 100 for example. Here, by way of example, each character is either a "0" or a "1".

For this purpose, the transmitter 4 is associated with a memory 14 in which the mathematical description $F_K$ of the cryptographic function is recorded. A mathematical description is a set of data determining the exact sequence of mathematical operations to be conducted in order to calculate, for every input value, the corresponding output value of this function, without any value other than the input value of the function having to be provided to the programme to conduct the calculations. This description $F_K$ is recorded in the memory 14 in a format which can be directly used by the transmitter so that module 12 is able, on the basis of this description, to perform its cryptographic function. Here, for example the description $F_K$ is a sequence of instructions forming a computer programme. However, in the remainder of this description, the mathematical descriptions of the functions will be solely shown in the forms of mathematical relations expressed using conventional symbols. The computer programme or programmes corresponding to the mathematical relations described below are easy to write.

The description $F_K$ will be described in more detail with respect to FIG. 2.

Module 10 is able to execute an encryption function E parametered by the control word $CW_a$ constructed by module 12 in order to encrypt content $B_a$ and to output a corresponding encrypted content $CB_a$. The encryption function E here is a conventional invertible encryption function. It is for example an AES encryption function (Advanced Encryption Standard) or the encryption algorithm known under the name "one time pad".

For each content $B_a$ encrypted by module 10 using the control word $CW_a$, the transmitter 4 is able to broadcast a data pair towards all the decoders in the system. This data pair is formed by the header $EB_a$ and the encrypted content $CB_a$.

To decrypt the data transmitted or broadcast by the transmitter 4 through the network 6, the decoder 8 comprises a calculation module 20 to calculate the control word $CW_a$ and a decryption module 22 to decrypt the encrypted content $CB_a$.

Module 20 is able to execute a cryptographic function. This function is defined by a mathematical description $F_{Kj}$ different from description $F_K$. More precisely, this description $F_{Kj}$ is different from all the descriptions $F_{Kj}$ used in the other decoders of the system 2. However, even though the mathematical description $F_{Kj}$ is different from description $F_K$, the function it defines is the same. Consequently, the conversion of the header $EB_a$ by module 20 makes it possible to obtain the control word $CW_a$, i.e. the same as the one which would have been obtained using module 12. Under these conditions, the description $F_{Kj}$ is said to be equivalent to description $F_K$.

Similarly to transmitter 4, the decoder 8 is associated with a memory 21 in which the mathematical description $F_{Kj}$ is recorded.

The description $F_{Kj}$ will be described in more detail with respect to FIG. 2.

Module 22 is able to execute a decryption function D. This function D is the inverse of function E making it possible to decrypt content $CB_a$ using the control word $CW_a$ constructed by module 20 on the basis of the received header $EB_a$.

The decoder 8 is also able to transmit the content $B_a$ decrypted by module 22 to a television set 26 on which it is displayed in clear.

The transmitter 4 and each of the decoders are based on conventional programmable calculators able to execute instructions recorded on a data recording medium. For this purpose, computer readable recording media including the memories 14 and 21, in addition to the secret parameters for encrypting and decrypting transmitted data, contain instructions for execution of the method in FIG. 2.

The functioning of the system 2 will now be described with reference to the method of FIG. 2.

The method of FIG. 2 is divided into three main phases. A set-up phase 50 of system 2, a use phase 52 of system 2 and finally a search phase 54 to search a traitor among the different lawful users of the system 2.

Phase 50 starts with a construction step 60 to construct the mathematical description $F_K$. For this purpose, r non-linear functions $g_i$ are constructed during an operation 62, r being a strictly positive integer. The number r of functions $g_i$ is chosen so as to verify the following relationship:

$$N < r!  \qquad (1)$$

in which N is the number of decoders in system 2.

These functions $g_i$ are constructed so as to be commutative between each other, through the composition operation, so that the following relationship is verified:

$$\forall i, 1 \in \{1, \ldots, r\}, i \neq 1 \; g_i \circ g_1 = g_1 \circ g_i \qquad (2)$$

in which the symbol o represents the composition operation of two mathematical functions.

Here, each of these functions is a non-linear function converting a tuple into another tuple. By tuple is meant here a set of n elements. For example the set of n coefficients of a polynomial of degree (n−1) may be considered a tuple.

Therefore, each function $g_1$ takes n input variables and outputs n calculated variables. Here they each correspond to a system of n non-linear equations with n variables, n is a strictly positive integer which here corresponds to the number of characters of the header $EB_a$.

Here, each function $g_1$ is chosen to form an encryption block $G_1$ of a multivariate encryption algorithm, when it is composed on the right and left with linear functions. An example of multivariate encryption algorithm is for example the C* algorithm proposed by Matsumoto and Imai in Tsutomu Matsumto and Hideki Imai, "Public Quadratic Polynomial-tuples for Efficient Signature Verification and Message Encryption, Advances in Cryptology"—EUROCRYPT '88 (Cristoph G. Günther, e d), Lecture Notes in Computer Science, vol. 330, Springer, 1988, pp. 419-453). Other examples of multivariate encryption algorithms are the algorithms known under the names SFLASH v2 (NESSIE project, New European Schemes for Signatures, Integrity and Encryption) and HFE (PATARIN Jacques Hidden Fields Equations (HFE)

and Isomorphisms of Polynomials (IP): two new families of Asymmetric Algorithms (Eurocrypt 96, Springer Verlag, pp. 33-48).

So as to obtain from elements $g_i$ a description that is both simple and compact of the resulting encryption blocks $G_i$, the $g_i$ functions are chosen as being monomial functions, called monomes.

As an example, here each of the functions $g_i$ operates on the elements an extension L' of degree n of a base body L with q elements. For example here q=2 and L={0.1}.

Extension L' is shown as the set of polynomials of form:

$$\sum_{i=0}^{n-1} a_i X^i$$

in which:
the coefficients are elements of the body L
the index i is an integer, and
X is a variable.

Extension L' is provided with the addition of polynomials and with multiplication modulo an irreducible polynomial of degree n defined by the following equation:

$$P(X) = \sum_{i=0}^{n-1} p_i X^i$$

in which:
the coefficients $p_i$ are predefined elements of body L, and
X is a variable.

As an example, the $g_i$ functions are functions of extension L' in extension L' of the form: $g_i(a) = a^{e_i}$ in which:
a is an element of extension L', and
the exponent $e_i$ is a predefined integer of the form $1 +_q{}^{\theta 1} + \ldots +_q{}^{\theta i} + \ldots +_q{}^{\theta d-1}$, in which q is the number of elements of body L and the exponents $\theta_i$ are predefined integers.

Here d is chosen to be equal to 2 so that the exponent $e_i$ of each of the functions $g_i$ has the form $1+q^{\theta 1}$.

The advantage of an exponent $e_i$ in this form is that if each element a of extension L' is identified with tuples ($a_o$, $a_1, \ldots, a_{n-1}$) of coefficients, each of coefficients $b_o, b_1 \ldots, b_{n-1}$ of element b of extension L' defined by the equation $b=g_i(a)$ is written as a function of degree d only of coefficients $a_o$, $a_1 \ldots, a_{n-1}$ of a. That is to say, here, as a quadratic function in the particular case when d equals 2. In this particular case, each coefficient $b_i$ may be written in the form of the following quadratic function:

$$b_i = (c_o a_o + \ldots + c_{n-1} a_{n-1}) + (c_{0,1} a_0 a_1 + \ldots + c_{0,n-1} a_0 a_{n-1}) + (c_{1,2} a_1 a_2 + \ldots + c_{1,n-1} a_1 a_{n-1}) + \ldots + c_{n-2,n-1} a_{n-2} a_{n-1}$$

in which the n coefficients $c_n$ and the n(n−1)/2 coefficients $c_{u,v}$ are constants belonging to the body L.

Therefore by means of the form of chosen exponent, the mathematical description of each function $g_i$ is compact and can be easily recorded in a memory.

Subsequently, during an operation 64, two functions S and T of L" over L" are chosen, in which L" is the set of tuples formed of elements of body L. Preferably, these S and T functions are linear invertible functions.

For example the mathematical description of each of these functions S and T is a matrix of n elements by n elements, each of these elements belonging to body L.

Description $F_K$ is subsequently constructed during an operation 66, by composing functions $g_i$ and functions S and T in the following manner:

$$F_K = T \circ g_r \circ g_{r-1} \circ \ldots \circ g_2 \circ g_1 \circ S. \quad (3)$$

After constructing description $F_K$, the method is continued by construction step 70 to construct the equivalent description $F_{Kj}$ for each decoder.

During this step 70, for each decoder j in the system, a single permutation σj of the set {1, 2, ..., r} over itself is defined during an operation 72. This permutation σj is for example constructed either randomly or is deduced from index j identifying the decoder and from a secret parameter M.

It is to be noted that it is possible to construct a single permutation for each decoder in the system since equation (1) is verified.

Subsequently, during an operation 74, r-1 bijections $f_{i,j}$ are chosen for user j. Each of these bijections $f_{i,j}$ is a invertible function of the L" assembly on itself. These bijections $f_{i,j}$ are for example described using a matrix of n elements by n elements, each of these elements belonging to body L.

For example, during this operation 74, the bijections $f_{i,j}$ are drawn randomly from the set of invertible linear applications of the L" set in itself. Another possibility is to deduce each of these bijections $f_{i,j}$ from the index j of the decoder and from the secret parameter M.

Finally, during an operation 76, the mathematical description $F_{Kj}$ is constructed. For this purpose, r elementary functions $G_{i,j}$ are constructed for decoder j. These functions $G_{i,j}$ are constructed by composing the functions S, T, $f_{i,j}$ and $g_i$ as follows:

$$G_{1,j} = f_{1,j}^{-1} \circ g_{\sigma j(1)} \circ S$$

$$G_{2,j} = f_{2,j}^{-1} \circ g_{\sigma j(2)} \circ f_{1,j}$$

$$\ldots$$

$$G_{r-1,j} = f_{r-1}^{-1} \circ g_{\sigma j(r-1)} \circ f_{r-2,j}$$

$$G_{r,j} = T \circ g_{\sigma j(r)} \circ f_{r-1,j} \quad (4)$$

in which:
$f^{-1}_{i,j}$ is the inverse of bijection $f_{i,j}$, and
$g_{\sigma j}(t)$ is function $g_i$ whose index i is equal to the permute of index t by permutation σj of user j, t belonging to the set {1, 2, . . . r}.

The property of function $g_i$ according to which each coefficient $b_i$ of element b of extension L' defined by the equation $b=g_i(a)$ may be written as a polynomial of degree d only, is conserved when function $g_i$ is composed on the right and left by bijections or linear functions. Therefore, the components of element y of L" defined by the equation $y=G_{i,j}(x)$ may be described by a polynomial of degree d only of the components $x_i$ of element x of L". For example when d equals 2, the component $y_i$ is defined using the following mathematical description:

$$y_i = (c'_o x_o + \ldots + c'_{n-1} x_{n-1}) + (c'_{0,1} x_0 x_1 + \ldots + c'_{0,n-1} x_0 x_{n-1}) + (c'_{1,2} x_1 x_2 + \ldots + c'_{1,n-1} x_1 x_{n-1}) + \ldots + c'_{n-2,n-1} x_{n-2} x_{n-1}$$

in which the n coefficients $c'_u$ and the n (n−1)/2 coefficients $c'_{u,v}$ are constants belonging to body L.

Therefore by means of the choice of exponent $e_i$ in the form $1+q^{\theta 1}$, the mathematical description of each elementary function $G_{i,j}$ is simple and compact and hence takes up little memory space. In particular, in the embodiment described here, the mathematical description of each elementary function $G_{i,j}$ is a system of n non-linear equations with n variables.

The description $F_{Kj}$ is formed by these r elementary functions $G_{i,j}$. By processing the input message with the equation (5): $F_{KJ}=G_{r,j}oG_{r-1,j}o \ldots oG_{2,j}oG_{1,j}$, exactly the same output message is obtained as the one which would have been obtained using description $F_K$. The equivalence of the mathematical descriptions $F_{Kj}$ and $F_K$ is easy to verify by replacing, in the preceding equation, each elementary function $G_{i,j}$ by its definition given by equation (4). By so doing in the previous equation, we obtain:

$$F_{Kj}=Tog_{\sigma j(r)}og_{\sigma j(r-1)}o \ldots og_{\sigma j(2)}og_{\sigma j(1)}oS$$

Since all the $g_i$ functions are commutative between each other, it is therefore shown that description $F_{Kj}$ is equivalent to description $F_K$.

It is therefore understood that the function of the bijections $f_{i,j}$ is to make the elementary functions $G_{i,j}$ non-commutative between each other. In this case, to obtain an equivalent description to description $F_K$, the elementary functions $G_{i,j}$ can only be composed with one another in the increasing order of their index i as in equation (5).

In addition, the sturdiness of the system against any attempted cryptanalysis, in the particular embodiment described herein, is based on the difficulty of the isomorphisms of polynomials, also known as the IP problem. With knowledge of the $G_{i,j}$ functions, it is mathematically very difficult, even with knowledge of all the functions $g_1$ to $g_r$, to identify the values $\sigma_j(i)$ since unknown functions are used in each elementary function $G_{i,j}$ for their camouflaging by composing on the right and left. Here, these unknown functions are functions S and T which are kept secret and the bijections $f_{i,j}$. Whereupon it is not possible for an unlawful user possessing a set of valid elementary functions $G_{i,j}$ to construct a new set of elementary functions $G'_{i,j}$ in which the order relationship defined by $\sigma_j$ between the $g_i$ functions is not maintained. In other words, since the unlawful user is incapable of finding functions S, T and $f_{i,j}$ from the elementary functions $G_{i,j}$ said user must be content with modifying the mathematical description of each elementary function $G_{i,j}$ without being able however to modify the order in which these elementary functions must be combined. Therefore since the order in which the elementary functions $G'_{i,j}$ are combined is not modified, the order in which the functions $g_i$ are combined is not modified either. The advantage of this property will become apparent on reading the remainder of the description.

Once the elementary functions $G_{i,j}$ have been constructed for each user j of system 2, they are distributed and recorded, during step 80, in the memory 21 of each decoder 8 in the form of a computer programme for example.

Also, during this step 80 the information necessary for executing traitor search phase 54 is recorded in memory 14 for example. In particular, all the functions used to construct each elementary function $G_{i,j}$ are recorded in this memory 14 and each of the permutations $\sigma_j$ used. The relationship between each permutation $\sigma_j$ and the decoder for which it has been used is recorded. Similarly a relationship enabling identification of a user from the identity of the decoder is recorded in this memory 14.

Once functions $G_{i,j}$ have been recorded in the memory of each decoder 8, the use phase 52 of system 2 can be initiated.

During this phase 52, the transmitter 4 randomly draws a new header $EB_a$ during step 84 at regular intervals, for example every second.

This header $EB_a$ is converted during step 86 by module 12 using description $F_K$ in order to obtain the control word $CW_a$.

Content $B_a$ is then encrypted by module 10 during a step 88 using function E and the control word $CW_a$. The encrypted content $CB_a$ and the header $EB_a$ used for this purpose are then broadcast conjointly, during step 90, by transmitter 4 through the network 6 towards all the decoders within system 2.

On receipt of the encrypted data, each decoder firstly proceeds during step 92 with calculating the control word $CW_a$ from the received header $EB_a$. During this step, the module 20 successively uses, and in order, each of the elementary functions $G_{i,j}$ recorded in its memory 21, so as to perform the calculation corresponding to the composite of the elementary functions $G_{i,j}$ in accordance with equation (5).

After this step 92, the module 20 outputs the same control word $CW_a$ as the one constructed by module 12 of transmitter 4.

Using this control word $CW_a$ and function D, the module 22 during step 94 decrypts the received encrypted content $CB_a$. The decrypted content $B_a$ delivered by module 22 is then transmitted for in-clear display to a television set 26 for example.

Steps 84 to 94 are repeated throughout the entire use phase of system 2 for each data item or data frame broadcast by transmitter 4.

For the remainder of the description, it is assumed that the user of decoder j has transmitted to an unlawful user his set of elementary functions $G_{i,j}$ so that this unlawful user is able to use a pirate decoder to decrypt the data broadcast by the transmitter 4 without having to pay a subscription for example. The user of decoder j is therefore the traitor since he has illegally and unlawfully transmitted secret data allowing decryption of data broadcast by transmitter 4.

Traitor search phase 54 starts by capturing and analysing, during step 100, a pirate decoder of the unlawful user. During this step 100, analysis of the decoder is made so as to detect therein the elementary functions $G_{i,j}$ unlawfully communicated to it by the traitor, and the order in which these functions $G_{i,j}$ are combined to convert the received header $EB_a$ into a control word $CW_a$.

The elementary functions found in the pirate decoder are here noted $G_{i,p}$ in which the index i indicates the order in which these elementary functions are used to convert the control word $EB_a$.

Subsequently each function $G_{i,p}$ is analyzed during step 102 to find the function $g_i$ on the basis of which it was constructed. Said analysis is possible for example for the operator of system 2 since the operator knows the functions S, T $f_{i,j}$ and $g_i$ used to construct the elementary functions $G_{i,j}$ of each user of the system.

Therefore after step 102, the operator of the system 2 is capable of saying that the elementary function $G_{1,p}$ was constructed from function $g_m$, that the elementary function $G_{2,p}$ was constructed from function $g_n$ and so on for each of the functions $G_{i,p}$ in which the indices m and n of functions $g_m$ and $g_n$ represent the index of the function $g_1$ used to construct $G_{1,p}$ and $G_{2,p}$ respectively.

On the basis of this information, the operator is therefore able, during step 104, to reconstruct the permutation $\sigma_j$ used during the construction of the elementary functions $G_{1,p}$ used in the pirate decoder. Once this permutation $\sigma_j$ is reconstructed, it is compared during step 106 with different permutations recorded in memory 14 during step 80.

By means of the above the traitor, i.e. the user of decoder j, is identified since in system 2 each permutation $\sigma_j$ corresponds to a single decoder itself associated with a single user.

This system and this method therefore prove to be particularly dissuasive to prevent lawful users from communicating the necessary data for decrypting encrypted contents $CB_a$.

Studies of the sturdiness of the method in FIG. 2 against attempted cryptanalysis have been conducted. These studies have shown in particular that the system and the method of FIG. 2 resist against attacks led by a coalition of k traitors, k being a positive integer greater than two. By coalition of k traitors is meant here a group of k lawful users who attempt, by pooling their respective sets of elementary functions $G_{i,j}$, to construct a new equivalent description of function $F_K$. It was shown that these unlawful users are able at the most to construct a function using one or more new sets of elementary functions $G_{i,p}$ from these k sets of elementary functions $G_{i,j}$. However any new set of elementary functions $G_{i,p}$ results from the combination of successive sequences of elementary functions $G_{i,j}$ extracted from each of the sets of elementary functions at its disposal. For example for a coalition of two traitors, the new set of elementary functions $G_{i,p}$ which an unlawful user could construct would be composed of the p first elementary functions $\{G_{1,1}, G_{2,1}, \ldots, G_{p,1}\}$ of the first traitor and of the r-p last elementary functions $(G_{p+1,2}, \ldots, G_{r,2})$ of the second traitor. To combat said attempted camouflaging of the traitor's identity, the number r of functions $g_1$ is chosen to be sufficiently high so that at least one traitor can be identified solely on the basis of the identification during phase 54 of only part of the permutation $\sigma_j$ used to construct his set of elementary functions $G_{i,j}$. For example, for a coalition of two traitors, r is chosen to be sufficiently high so that at least one of the traitors can be identified either on the basis of the p first elementary functions $G_{i,1}$ or on the basis of the r-p last elementary functions $G_{i,2}$.

It will be noted in the above method that the same secret data, i.e. the cryptographic functions associated with descriptions $F_K$, $F_{Kj}$ are used to encrypt and decrypt so that the described encryption method has the same characteristics as an algorithm of symmetric encryption. In particular, by means of this property, the method described here is quicker than an algorithm of asymmetric encryption.

Here the functions S, T, $f_{i,j}$ must be kept secret, whilst the functions $g_i$ are optionally published.

In system 2, only one same function for calculating the control word $CW_a$ is used both in the transmitter 4 and in the decoders. Therefore this cryptographic function does not need to be invertible which facilitates the choice and construction of functions $g_i$. However, as a variant, the description $F_K$ corresponds to an encryption function and descriptions $F_{Kj}$ correspond to the inverse of this encryption function. In this variant, the different decriptions $F_{Kj}$ implanted in the different decoders of the system are equivalent to one another and are descriptions equivalent to the inverse of the function defined by description $F_K$. The previously described construction of descriptions $F_{Kj}$ applies, the only difference being that functions $g_i$ must be invertible in this variant. In this case the description $F_K$ is for example used to encrypt content $B_a$ directly, whilst the equivalent descriptions $F_{Kj}$ are used to decrypt encrypted contents $CB_a$ directly.

Here the cryptographic function corresponding to descriptions $F_K$ and $F_{Ki}$ converts an initial message coded over n characters into a converted message also coded over the same number of characters. This cryptographic functions does not increase the size of the converted message with respect to the size of the initial message, contrary to the finding with asymmetric algorithms for example. As a variant, the cryptographic function increases the size of the converted message with respect to the size of the initial message. It will be noted however that in this variant this increase in size remains independent from the number of traitors.

System 2 has been described in the particular case in which a description $F_{Kj}$ is associated with a single decoder. s a variant, one same description $F_{Kj}$ is associated with a group of decoders. In this variant, all the decoders of system 2 are grouped together in several groups so that the description $F_{Kj}$ identifies not a particular decoder but the group to which this particular decoder belongs.

The invention claimed is:

1. A traceable method for encrypting and/or decrypting data broadcast by at least one transmitter towards several decoders, this method enabling the identification of a traitor, amongst different lawful users of the decoders, who has communicated secret data to a non-authorized third party so that this third party is able to encrypt and/or decrypt data broadcast by the transmitter, in which:

during encryption of the broadcast data, the transmitter applies at least a first secret cryptographic function, and during decryption of said broadcast data, all the decoders apply at least one same second secret cryptographic function identical to said first function or its inverse, each decoder having recourse for this purpose to a mathematical description of said second function recorded in a memory, wherein during the application of the second function the mathematical description of this second function, to which each decoder has recourse, is different from one decoder to another or from one group of decoders to another so that the mathematical description to which recourse is made exclusively identifies the particular decoder or group of decoders among all the decoders; and wherein said mathematical description ($F_{Kj}$) recorded in the memory of each decoder is formed of several elementary functions ($G_{i,j}$) which must be composed with each other in a determined order to form said second secret function.

2. The method as in claim 1, wherein the second cryptographic function is able to process non-redundant data.

3. A computer readable recording medium with a computer program recorded thereon, the computer program comprises instructions for the execution of a traceable data encryption and/or decryption method as in claim 2, when said instructions are executed by a transmitter.

4. The method as in claim 1, wherein each elementary function ($G_{i,j}$) is equal to the composite of at least three functions as per one of the following equations:

$$G_{1,j} = f'_{1,j} \circ g_{\sigma j(1)} \circ S$$

$$G_{2,j} = f'_{2,j} \circ g_{\sigma j(2)} \circ f_{1,j}$$

$$\ldots$$

$$G_{r-1,j} = f'_{r-1,j} \circ g_{\sigma j(r-1)} \circ f_{r-2,j}$$

$$G_{r,j} = T \circ g_{\sigma j(r)} \circ f_{r-1,j}$$

in which:

$G_{i,j}$ is the -th elementary function of decoder j, j being the index identifying a decoder or group of decoders, functions $f_{i,j}$ and $f'_{i,j}$ are predefined functions able to render the elementary functions $G_{i,j}$ non-commutative between each other, $\sigma_j$ is a permutation of all indices $\{1; \ldots; r\}$ unique to each decoder or group of decoders, $g_{\sigma j(t)}$ is the $\sigma_{j(t)}$-th function of a predefined whole formed of r non-linear predefined functions $g_i$ commutative between each other, and S and T are predefined functions able to render difficult the cryptanalysis of elementary functions $G_{1,j}$ and $G_{r,j}$ respectively.

5. A computer readable recording medium with a computer program recorded thereon, the computer program comprises instructions for the execution of a traceable data encryption and/or decryption method as in claim 4, when said instructions are executed by a transmitter.

6. The method as in claim 4, wherein each function $f'_{i,j}$ is equal to the inverse $f_{i,j}^{-1}$ of function $f_{i,j}$.

7. A computer readable recording medium with a computer program recorded thereon, the computer program comprises instructions for the execution of a traceable data encryption and/or decryption method as in claim 6, when said instructions are executed by a transmitter.

8. The method as in claim 4, wherein the functions $f_{i,j}$ are linear functions of a set (L″) of the tuples of elements of a finished body (L) on itself.

9. A computer readable recording medium with a computer program recorded thereon, the computer program comprises instructions for the execution of a traceable data encryption and/or decryption method as in claim 8, when said instructions are executed by a transmitter.

10. The method as in claim 4, wherein the functions S and T are invertible.

11. The method as in claim 4, wherein the functions S and T are linear functions of a set (L″) of the tuples of elements of a finished body (L) towards itself.

12. The method as in claim 4, wherein the functions $g_i$ are chosen so that each elementary function $G_{i,j}$ corresponds to an encryption block of a multivariate encryption algorithm.

13. The method as in claim 4, wherein each function $g_i$ is of the form $g_i(a) = a^{e_i}$ in which a is an element of an L′ extension of degree n of a basic body L with q elements, and $e_i$ is a predefined exponent.

14. The method as in claim 13, wherein the exponent $e_i$ is of the form:

$1 + q^{\theta_1} + \ldots + q^{\theta_i} + \ldots + q^{\theta_{d-1}}$, in which the exponents $\theta_i$ are predefined integers.

15. A computer-readable recording medium with a computer program recorded thereon, the computer program comprises instructions for the execution of a traceable encryption and/or decryption method according to claim 1, when these instructions are executed by a decoder.

16. A computer readable recording medium with a computer program recorded thereon, the computer program comprises instructions for the execution of a traceable data encryption and/or decryption method as in claim 1, when said instructions are executed by a transmitter.

17. A traceable system for encrypting and/or decrypting broadcast data capable of identifying a traitor, among different lawful users, who has communicated secret data to a non-authorized third party so that this third party is configured to encrypt and/or decrypt the broadcast data, this system comprising:

a transmitter configured to encrypt broadcast data, this transmitter being capable of applying at least a first secret cryptographic function, to directly process a message, then of broadcasting the message, several decoders able to decrypt broadcast data, all the decoders being able to apply a second secret cryptographic function identical to said first function or to its inverse for the direct processing of said broadcast message, each decoder for this purpose being equipped with a memory in which a mathematical description of said second function is recorded;

wherein the memory of each decoder contains a mathematical description of said second function different from the one recorded in the memory of the other decoders or in the memory of the other groups of decoders so that this mathematical description exclusively identifies the particular decoder or group of decoders among all the decoders; and wherein said mathematical description ($F_{Kj}$) recorded in the memory of each decoder is formed of several elementary functions ($G_{i,j}$) which must be composed with each other in a determined order to form said second secret function.

18. The memory intended to be associated with a decoder of a traceable data encryption and/or decryption system according to claim 17, wherein it comprises a mathematical description equivalent to said second secret function able to be used by the decoder, this mathematical description consisting of several elementary functions ($G_{i,j}$) each of which is equal to the composite of at least three functions as per one of the following equations:

$G_{1,j} = f'_{1,j} \circ g_{\sigma j(1)} \circ S$ $G_{2,j} = f'_{2,j} \circ g_{\sigma j(2)} \circ f_{1,j}$

...

$G_{r-1,j} = f'_{r-1,j} \circ g_{\sigma j(r-1)} \circ f_{r-2,j}$ $G_{r,j} = T \circ g_{\sigma j(r)} \circ f_{r-1,j}$ in which:

$G_{i,j}$ is the -th elementary function of decoder j, j being the index identifying a decoder or group of decoders, functions $f_{i,j}$ and $f'_{i,j}$ are predefined functions able to render the elementary functions $G_{i,j}$ non-commutative between each other, $\sigma_j$ is a permutation of all indices $\{1; \ldots; r\}$ unique to each decoder or group of decoders, $g_{\sigma j(t)}$ is the $\sigma_{j(t)}$-th function of a predefined whole formed of r non-linear predefined functions $g_i$ commutative between each other, and S and T are predefined functions able to render difficult the cryptanalysis of elementary functions $G_{1,j}$ and $G_{r,j}$ respectively.

* * * * *